United States Patent [19]

Lindenthal

[11] Patent Number: 5,746,659

[45] Date of Patent: May 5, 1998

[54] FLANGE DRIVER FOR A CARDAN SHAFT

[75] Inventor: Hans Lindenthal, Heidenheim, Germany

[73] Assignee: J. M. Voith GmbH, Germany

[21] Appl. No.: 674,978

[22] Filed: Jul. 3, 1996

Related U.S. Application Data

[63] Continuation of Ser. No. 231,336, Apr. 22, 1994, abandoned.

[30] Foreign Application Priority Data

Apr. 22, 1983 [DE] Germany .......................... 43 13 141.7

[51] Int. Cl.$^6$ .......................................... F16D 3/38
[52] U.S. Cl. ................................... 464/135; 403/364
[58] Field of Search ............................. 464/134, 135, 464/136; 403/364, 53, 340

[56] References Cited

U.S. PATENT DOCUMENTS

| | | | |
|---|---|---|---|
| 4,899,815 | 2/1990 | Bosch et al. | 403/364 X |
| 5,035,676 | 7/1991 | Koelling, Sr. | 464/135 |

FOREIGN PATENT DOCUMENTS

| | | | |
|---|---|---|---|
| 0 206 026 | 12/1986 | European Pat. Off. | |
| 0206026 | 12/1986 | European Pat. Off. | |
| 2165014 | 8/1973 | France . | |
| 2448068 | 10/1980 | France | 464/135 |
| 2505268 | 11/1982 | France | 403/364 |
| 33 14 322A1 | 10/1984 | Germany . | |
| 3314322A1 | 10/1984 | Germany . | |
| 38 41 341C1 | 5/1990 | Germany . | |
| 3841341C1 | 5/1990 | Germany . | |
| 93 15 717.7 | 2/1994 | Germany . | |
| 9315717.7 | 2/1994 | Germany . | |
| 709298 | 5/1954 | United Kingdom . | |
| 002252394 | 8/1992 | United Kingdom | 464/134 |

OTHER PUBLICATIONS

DIN 3960—Germany.

*Primary Examiner*—Daniel P. Stodola
*Assistant Examiner*—Emmanuel M. Marcelo
*Attorney, Agent, or Firm*—Baker & Daniels

[57] ABSTRACT

A flange driver for a cardan joint with a spider comprised of two pins mutually offset by 90° and two essentially same-design yoke halves. Each yoke half includes a base and a bearing part with a bore contained in it. Both yoke halves abutt along an interface which is essentially perpendicular to the axis of a first spider pin supported by the yoke. Both yoke halves feature a system for torque transmission from the shaft adjoining the joint to the flange driver and to the spider or in reverse order. Both yoke halves of the flange driver are joined to each other positively. Each yoke half features on its interface a toothing directed toward the respective complementary interface. The flank lines of the toothing or a plurality of tangents to the flank lines, projected in a common plane with the yoke axis, extend at an angle greater than 0° to smaller than 180° relative to the yoke axis.

9 Claims, 6 Drawing Sheets

FLANGE DRIVER FOR A CARDAN SHAFT

This is a continuation of application Ser. No. 08/231,336, filed Apr. 22, 1994, now abandoned.

BACKGROUND OF THE INVENTION

The invention concerns a flange driver intended for the U-joint of a cardan shaft and comprised of two mutually complementary yoke halves.

Embodiments of split flange drivers are previously known, for instance from the German 6 93 15 717.7 and EP 0 206 026. Cardan yokes of split design enable the construction of integral and dimensionally stable bearing eyes which, the same as in an undivided yoke, remain an integral part of the adjoining yoke arm by way of which the force is transmitted to the bearing eye. In this way there occurs no interruption of the flow of force at the specifically most stressed point of the yoke. Arranged in the plane of symmetry between the eyes of the yoke, the parting point is situated in the area of lowest stress, which has no effect whatsoever on the transmission of force. These arrangements offer the advantage of a sound bedding of the bearing in the eye, of a very easy assembly and an increased load capacity of the bearing. At the same time, split yokes offer considerable advantages in their manufacture, processing, shipping and storage.

In detail, there are various engineering options for torque transmission known, to achieve the transmission of force between the input and output shafts. The yoke halves styled as described in EP 0 260 026 feature each a flange which on its side away from the spider axis possesses positive-locking elements, so that a positive connection is established with the driven shaft or the shaft being driven. Additionally there are releasable connections provided between the flange and the respective shaft, for example by means of antifatigue-shaft bolts.

The interfaces of the yoke halves are arranged here essentially mutually parallel and feature opposed keyways in the center area. Keys of square shape are inserted in these keyways. They serve primarily to prevent the yoke halves from shifting mutually parallel to the axis of the spider pin mounted in the yoke. Avoiding a relative motion of the yoke halves perpendicularly to the spider pin axis, i.e., in the direction of the yoke axis, is not feasible with this solution; neither can the yoke halves be prestressed relative to each other. The result, especially in reverse operation, is a lift-off of individual areas of the yoke halves under the effect of the peripheral force. The lift-off also causes a relative motion of the positive-locking elements onto the recesses in the adjoining shaft, which—in turn—leads to the creation of voids which allow the accumulation of moisture and seepage water. The result are corrosion phenomena, which are promoted yet by the micromotion of the yoke halves.

In the styling described in 693 15 717.7, the two yoke halves are joined by means of a positive-locking joint and feature, common to both yoke halves, a system for torque transmission from the shaft adjoining the cardan joint to the flange driver and spider, respectively also in reverse order. The embodiments proposed in 693 15 717.7 for a positive-locking joint are, in part, very manufacturing-and assembly-intensive.

Therefore, the problem underlying the invention is to further advance a flange driver of the initially named kind to the effect that the cited drawbacks will be avoided while maintaining a favorable design of the flange driver for accommodating the bearing and achieving maximally high bearing forces, the same as in the unpublished 693 15 717.7 and that a low-cost manufacture with effective utilization of existing capacities and an easy assembly are accomplished. A further essential problem consists in achieving at low cost an optimum seal so as to avoid fretting corrosion and other corrosion phenomena closely associated with the problem, which, in turn, favors a long service life of the flange drivers.

SUMMARY OF THE INVENTION

According to the invention, the problem may be solved in two ways. With the first solution, the flange driver is composed of two mutually complementary yoke halves which abutt along an interface of an orientation essentially perpendicular to the axis of a spider pin supported by the yoke. Mutually complementary yoke halves are to be understood as being able to complement each other to form an assembly—a yoke. Each yoke half features on its interface a toothing directed toward the respective complementary interface. The toothing direction is inventionally selected such that the flank lines of the teeth or a plurality of tangents to the flank lines projected in a common plane to the yoke axis, extend inclined respectively at an angle greater than 0° and smaller than 180°. "Projection"means to take a view perpendicular to yoke axis and also perpendicular to the flank line, or to a plurality of tangents on a flank line at the interface. In this view, the flank lines or the tangents are inclined to the yoke axis. The description of teeth-direction by means of projection is also possible in the case of a skewed position between the yoke axis and flank lines. Hence, the alignment of the toothing is such that the latter may assume any position relative to the yoke axis, except a position parallel to the yoke axis, which would allow a motion of the yoke halves in the direction of the yoke axis. Essentially two cases may be differentiated.

1) The flank lines of the toothing or a plurality of tangents to the flank line tilt relative to a plane formed by the yoke axis and the axis of a pin assembled in the yoke.
2) The flank lines of the toothing or a plurality of tangents to the flank line are parallel to this plane, but except for the toothing's extension parallel to the yoke axis, here as well.

In both cases, when projecting the flank lines or the tangents to the flank lines and the yoke axis in a common plane, the flank line or the tangents intersect the yoke axis once.

The toothing is preferably arranged in the interface area which lies radially outside, relative to the yoke axis. However, an arrangement across the entire interface is conceivable as well.

Both yoke halves preferably have an essentially symmetric structure. But an asymmetric design of the bases of both yoke halves is possible too. In this case, one of the two yoke halves may for example feature a recess while the other yoke half possesses the overlap which is complementary to it, whereby the position of both yoke halves relative to each other is defined exactly. The toothings can then be arranged in the interface areas formed by the overlaps and recesses.

Providing on the interface of the two yoke halves a toothing, preferably a spur toothing with oblique flanks, whose flank lines, when projected in a common plane with the yoke axis, extend inclined to it, enables a positive connection between both yoke halves. Prestressing the flanks precludes a relative motion between the yoke halves perpendicularly to the pin axis, that is, in the direction of the yoke axis.

The yoke axis is preferably situated in the plane of symmetry between the two yoke halves and extends perpendicularly to the axis of the pin assembled in this yoke. Symmetry of the two yoke halves is very easy to achieve in terms of production engineering, but is not mandatory. The toothing design is preferably such that the flank lines respectively their extensions, projected in a plane with the yoke axis, extend perpendicularly to the yoke axis and perpendicularly to a plane formed by the yoke axis and an axis of a spider pin assembled in the yoke.

To secure a seal, which is necessary to reduce notch stresses, a round-section cord of an elastomer material is inserted between the meshing toothings, between root circle and addendum circle.

The interface provides relatively large surface areas for machining a toothing, so that relatively low surface pressures are achievable. The toothing may be formed across the entire interface or only in the outer areas of the interface. The former option imposes stringent requirements on manufacturing, while additional sealing measures need to be provided for with the latter option.

Due to the serration arranged preferably on the flange underside away from the pin axis, the flank lines of which extend in radial direction relative to the yoke axis, and to the screw joints between flange driver and connecting piece, a self-centering and nonpositive connection is being entered into with the adjoining shaft or connecting piece. This connection prevents a motion of the yoke halves relative to each other, parallel to the axis of the spider pin assembled in this yoke respectively perpendicularly to the yoke axis.

Owing to the positive joint at the interfaces of the yoke halves, the tensile and compression stresses opposing one another in one half of the connecting piece are mutually balanced in the connecting piece or toothing, that is, an equal load distribution is achieved across the entire cross section of the connecting piece.

Micromotions in the toothing between the connecting piece and the yoke, in the joint to the adjoining shaft, are avoided, and thus also the creation of voids which might allow accumulations of seepage water and similar. The additional mechanical stress occasioned by the relative motion, which results in promoting the corrosion effect at the contact points, is thereby precluded as well.

Several inventional designs of a two-part flange driver enable the incorporation of new process steps in their manufacture. The entire flange driver is an integral casting, and its bearing parts are provided with bores; the final shape of the flange driver should be allowed for in selecting the casting contour. With several styles, for instance, an oval casting contour is required to obtain an ultimately circular base of the flange driver. Moreover, bores are additionally provided which extend preferably parallel to the axis of the pin assembled in this flange driver and through the entire base. The flange driver is then split in the plane of symmetry between the yokes, and mutually complementary, preferably spur toothings are machined into the interfaces, arranged preferably in the outer interface areas. The use of hypoid toothing is conceivable too. But the flank lines of the toothing, or tangent lines thereto, projected in a plane with the yoke axis, must be inclined relative to the yoke axis; they extend preferably perpendicularly to the yoke axis. The mutually complementary toothings on the interfaces, based on the pin axis in paired state, are mutually offset by a specific amount of the pitch. The two yoke halves are then joined with the aid of anchor bolts, and the serration is machined in the side of both bases away from the pin axis. In addition to fastening, the purpose of the anchor bolts is primarily to considerably facilitate the manufacture and assembly. They do not participate in the transmission of force.

The toothing on the interfaces will preferably be provided in the same toothing size as the serration on the underside of the flange driver. This makes it possible to more effectively utilize existing tools.

The yoke halves of the flange driver may also be manufactured separately, that is, each half by itself.

There are several variants for design and arrangement of the toothing, but one should always make sure that the flank lines never assume a parallel position relative to the yoke axis, which normally corresponds to the axis of the joint. Toothings whose flank lines or a plurality of the tangents to the flank line which at projection in a common plane with the yoke axis extend inclined relative to the yoke axis, that is, assume relative to the yoke axis an angle greater than 0° and smaller than 90° as well as greater than 90° and smaller than 180°, are preferably fashioned in mutually opposite direction, or mirror-inverted, in the two radially outer interface areas of a yoke half.

Furthermore, the yoke may for instance be fashioned of two asymmetric yoke halves having in the joining area a connecting piece, that is, the yoke consists of two yoke halves with unequal bases. The base of one yoke half features in this case a recess while the base of the other yoke half of complementary design possesses the overlap that complements the recess.

The second option for problem solution consists in removing, prior to splitting the flange driver, a segment from the base areas that are stressed to a lesser degree and providing on the mutually complementary interfaces of segment and yoke halves a respective toothing, as described before. The flange driver may be manufactured such that the segment is removed perpendicularly to the plane of symmetry of the flange driver, or in a way such that the segment part features a recess in it contour, and the flange driver is subsequently split in two yoke halves parallel to the plane of symmetry of the flange driver. To be noted here too, however, is the relationship between casting contour and the flange driver contour which exists after machining of the toothing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, which illustrate in.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

FIG. 1 shows on a flange driver of conventional design schematically the effect of the peripheral force $F_u$ which in the transmission of a torque acts on the spider pin, on the yoke halves. The positional deviations illustrated here are for better understanding not true to scale and depicted heavily exaggerated. The deformations of the individual yoke halves were not allowed for.

Figure 7:
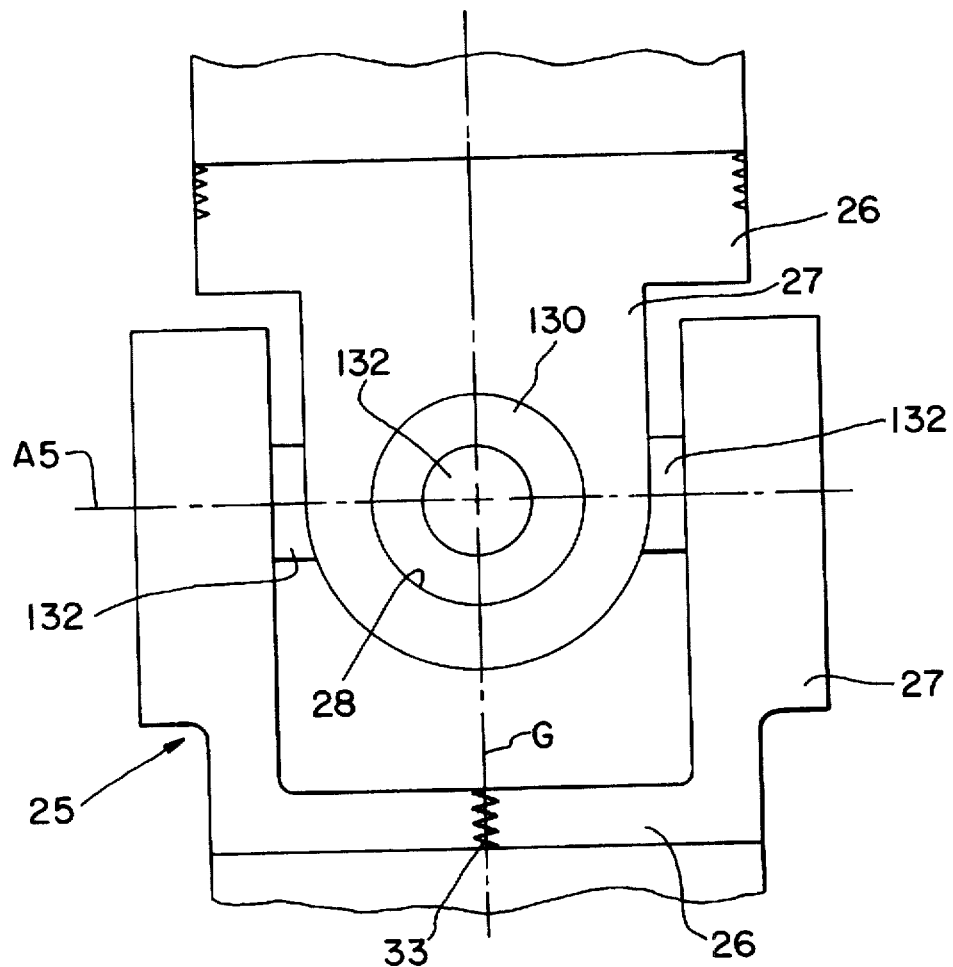
FIG. 7, a spider including two pins mounted in the flanger driver.

A split yoke 1, comprised of a yoke half 2 and a yoke half 3, is schematically shown here in plan view. Each of the yoke halves 2 and 3 features a base 4, 5 and, integral with it, a bearing part 6, 7 extending from the base and with a bore 8, 9 disposed therein for accommodating a bearing 132, for the spider pins 130, as illustrated in FIG. 7. Base 4, 5 is fashioned as a flange describing a semicircle, as depicted in FIG. 1b, taken along line II in FIG. 1a, on the underside of flange 4. Planes E1, E2 defined by flanges 4, 5, respectively, extend parallel to planes E3, E4 formed by a vertical line A5 drawn through the intersection M1 respectively M2 of the center axis A1 respectively A2 and A3 respectively A4 of the bore 8 respectively 9 and is laid through the root circle of the toothings arranged on the underside of the flange 4 respectively 5. For simplicity, only the axes of the yoke half 2 are illustrated here. The side 10, 11 of the flange 2, 3 away from the plane E3, E4 features in the area of its outer circumference 12 each a toothing 13, 14, respectively. These toothings are preferably fashioned as serrations and arranged across the entire circumference 12 described by the semicircle (FIG. 1b). The flank line of the serration extends radially and the teeth are directed away, perpendicularly, from the pin axis.

The flange 4, 5 is joined here to a connecting piece 21 on the adjoining shaft 21 by screw joints 15, 16, 17 and 18, 19, 20, which shaft may be situated both on the input and output side. The connecting piece 21 features on its end face 22 on the near side of the yoke halves as well a toothing 23 coordinated in complementary fashion with the flange toothings 13, 14, which toothing 23 establishes with appropriate prestress a self-centering connection with the toothing on the underside of the flange.

A peripheral force $F_u$ acting on the yoke due to the torque to be transmitted causes in conjunction with a not illustrated deformation of the yoke halves a shift between the toothings 23 with 13 and 14.

The extreme case chosen for illustration here and representing a partial elimination of the connection between yoke halves 2, 3 and connecting part 21 is not relevant in practice. But the effect of the peripheral force leads to forces directed differently, which become effective in the screw joints and thus lead to different stresses of the joint and to motions of the toothings relative to each other which, in turn, cause the creation or augmentation of small voids between the flanks of the meshing teeth. Moisture and seepage water accumulate in these voids, resulting in corrosion. The corrosion effect is further amplified by the motion at the contact points of the toothings with one another.

In the example illustrated here, the peripheral force $F_u$ causes on the flange 4 of yoke half 2 a moment M which expresses itself in the action of a force FA on screw joint 17 in the same direction as the prestressing force of the screws and of a force FB on screw joint 15 opposite to the prestressing force. The screw joint 17 is subjected to tensile stress, with the tension force adding here to the prestressing force. Simultaneously, the connecting piece is subjected to tensile stresses as well in the area of the screw joint. Screw joint 15 is being relieved, since the force FB is effective as a compression force and directed opposite to the prestressing force. In the area of screw joint 15, the connecting piece 21 and the toothing are subjected to compression. The toothing on the side of screw joint 17 is relieved, for which reason this half of the yoke half is called the passive side. The toothing in the area of screw joint 15 is stressed, for which reason this half of the yoke half is called the active side. The forces FA' and FB' on the opposite complementary yoke half 3 act analogously. However, tensile and compression stresses always oppose each other.

With an unchanging operating mode, i.e., without reverse operation, no change is taking place between passive and active sides. This means that the individual sides of the yoke halves are exposed always to the same stress, that always the same areas of the connecting piece 21 are exposed to tensile and compression stresses.

FIG. 1b depicts at positional change of flange 4 under the effect of the peripheral force $F_u$ the positional change of the flange underside with the machined spur serration opposite the bores 24 in the connecting piece 21.

Figure 1A:
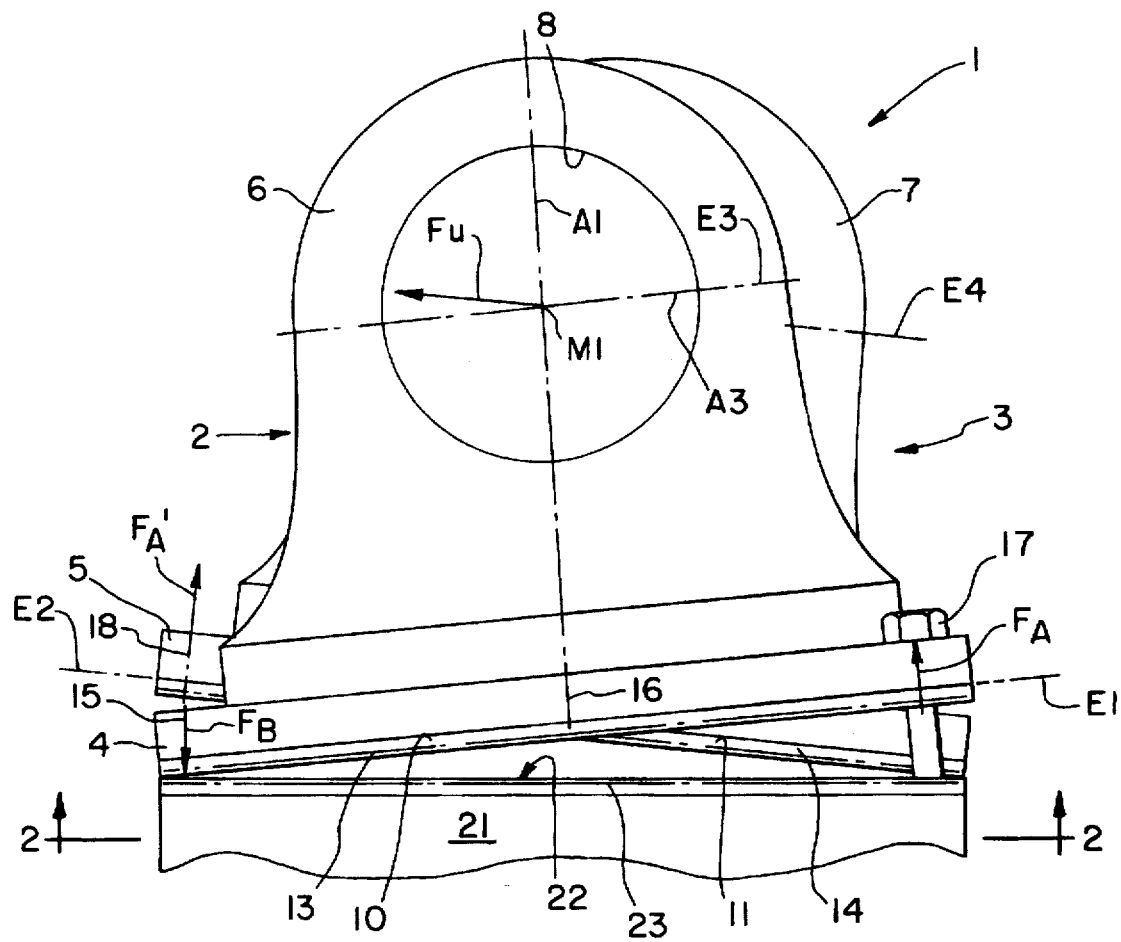
FIGS. 1a and 1b the effect of the peripheral force on the yoke halves (not to scale for clarity) of a conventional yoke in different views.
Figure 1B:
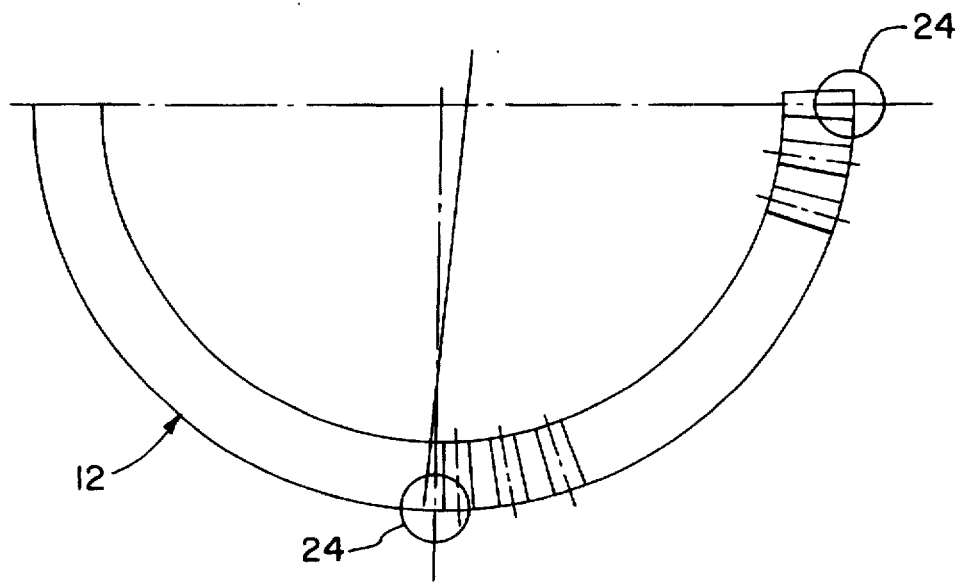
Figure 2A:
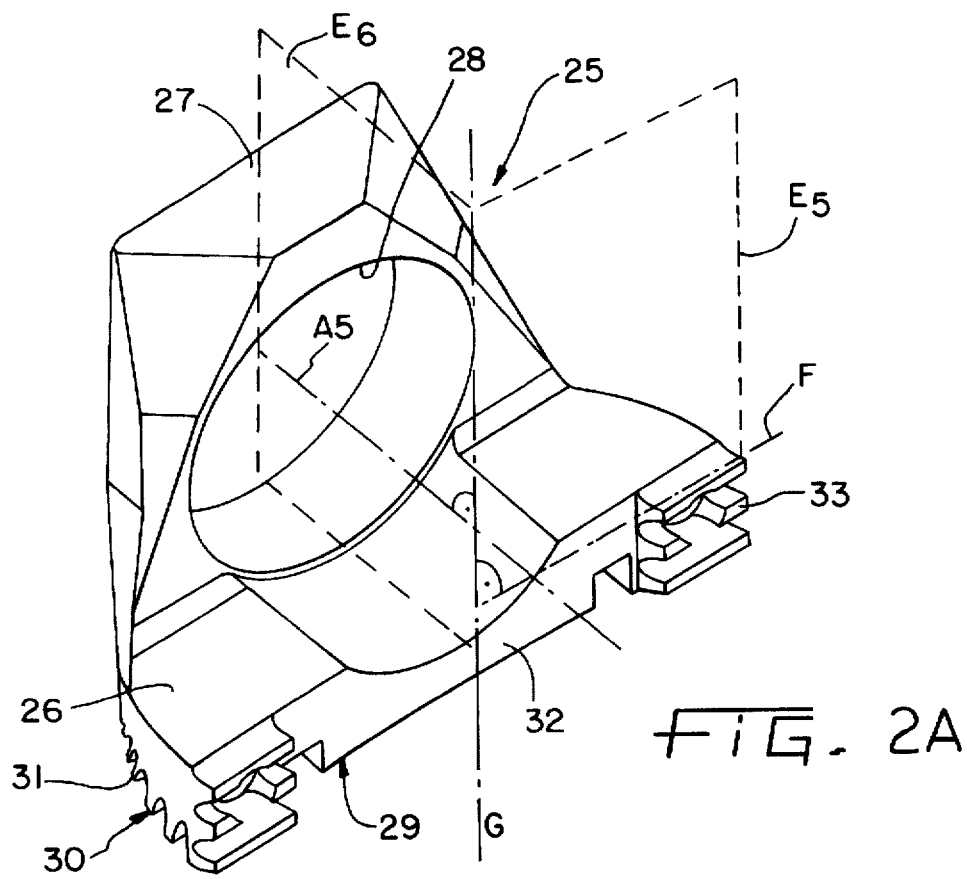
FIGS. 2a and 2b inventional embodiments of a yoke half in perspective projection with spur and hypoid toothing.

FIG. 2a shows a perspective view of an inventionally designed yoke half 25. Analogous to that described in FIG. 1, the yoke half is comprised of a base 26 fashioned as a flange and a bearing part 27 forming with the base a unit and featuring a bearing bore 28. Flange 26 is semicircular in design and features on its side 29 away from the bearing part, in the area of the outer circumference 30, a toothing 31 extending across the entire circular arc. This toothing 31 is aligned axially to the one on the connecting piece 21 to be connected with it, which is not illustrated here, and the flank lines of the toothing extend in relation to the flange shape in radial direction.

The toothing 31 is fashioned as a spur serration, which in interaction with the pertaining complementary serration on the not illustrated connecting piece, such as shaft 21 in FIG. 1a, provides a nonpositive and self-centering connection.

On the interface 32, the yoke half possesses a spur toothing 33 whose flank lines F, projected in a common plane with the pin axis AS, extend perpendicularly to the pin axis A5 and, projected in a common plane E5 with the yoke axis G, assume a perpendicular position relative to the yoke axis G. For reason of clarity, only the plane E5 is depicted in this figure. That means in this case that the extensions of the flank lines—here for example flank line F, illustrated by dash—dot lines—intersects a plane E6 which is described by pin axis A5 and yoke axis G. The extension of flank line F rests in the illustrated example perpendicularly on this plane E6. This toothing is preferably arranged in the outer areas of the interface. But, not illustrated here, there is also the option of providing the toothing across the entire interface.

The size of the spur serration 31 is preferably chosen equal to that of the spur toothing 33. This enables the use of same tools, which expresses itself in a more effective utilization of the existing machine tool.

Figure 2B:
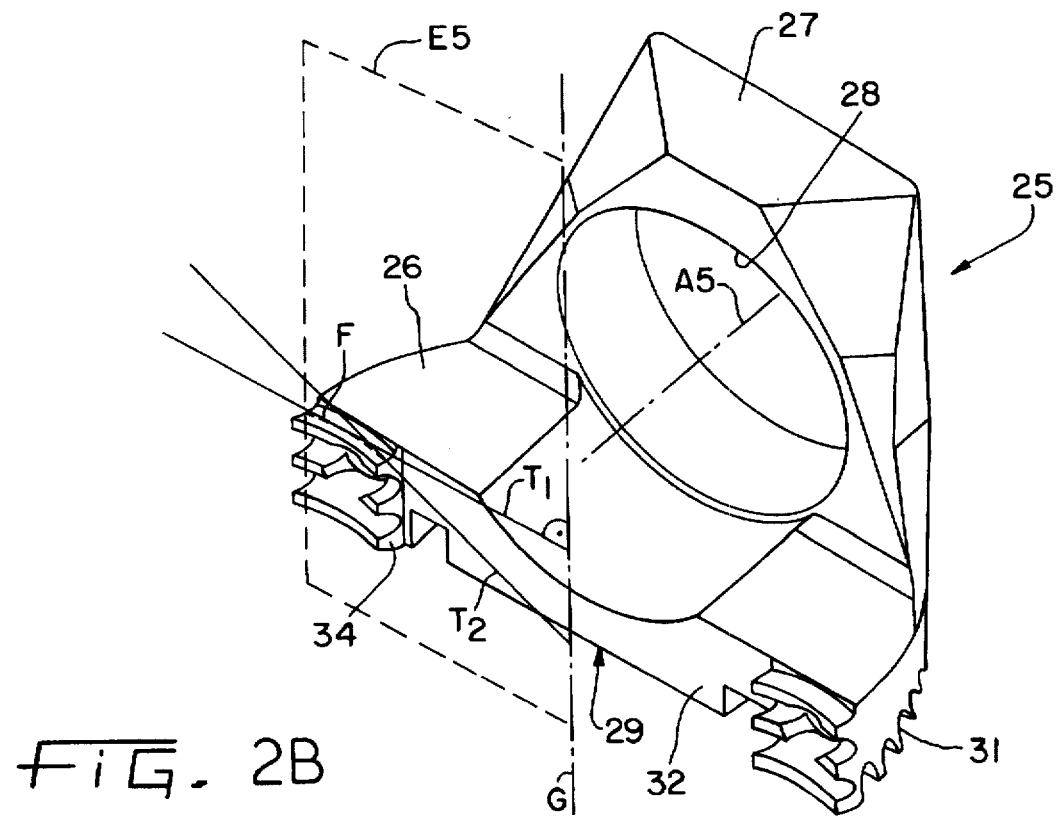

FIG. 2b illustrates, the same as FIG. 2a, a perspective view of a yoke half 25 whose toothing on the interface 32, however, is fashioned as a hypoid toothing 34. The basic structure of the yoke half matches that of the yoke half described in FIG. 2a, for which reason these references were adopted. A plurality of tangents T to a flank line F, illustrated here as an example in the form of a broken line, extend at projection in a common plane E5 with the yoke axis G at an inclination, that is, at an angle greater than 0° and smaller than 180°, to the yoke axis G. For reason of clarity, the figure shows in lieu only the two tangents T1 and T2 to the flank line F, which extend inclined to the yoke axis G.

Illustrated in the radially outer areas of interface 32 in FIGS. 2a and 2b are unreferenced bores. The yoke halves complementary to the yoke halves illustrated in FIGS. 2a and 2b feature as well a through-bore or tapped bores. They serve to receive anchor bolts respectively to establish a screw joint between the two yoke halves. Besides fastening, the purpose of the anchor bolts respectively screw joints consists primarily in considerably facilitating the manufacture and assembly. They do not participate in the transmission of force.

FIGS. 3 show a solution for sealing the positive joint between the yoke halves.

Figure 3A:
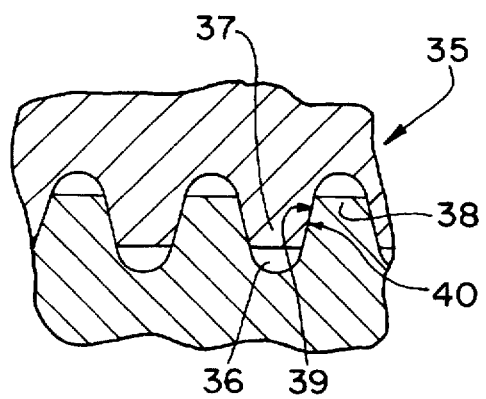
FIGS. 3a through 3c options for achieving seals on the toothings.
Figure 3B:
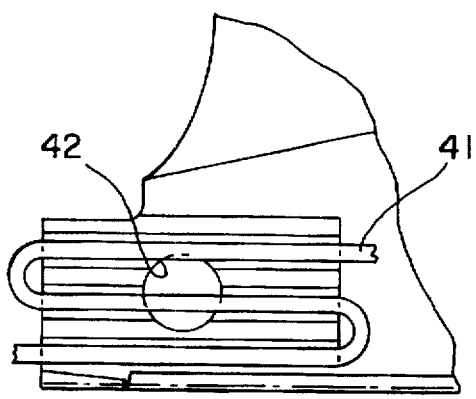

FIG. 3a is a profile section of a toothing 35 such as may be employed, e.g., in an embodiment according to FIG. 2a, without seal. For reason of economical manufacture and reduction of notch stresses in the tooth root, voids 36 are inevitable in meshing the teeth 37/38 for achieving a transmission of force, for it is essential for force transmission that the flanks 39 and 40 bear on each other. These voids 36 are reservoirs for moisture and seepage water and thus ideal corrosion promoters. Therefore, as a sealing option easy to achieve, use of a round-section cord 41 of elastomer material is provided for, which, as illustrated in FIG. 3b, meanders through the toothing.

This round-section cord is inserted in only one yoke half, preferably fastened yet with an adhesive, and then compressed due to the oppositely acting toothing of the other yoke half not illustrated here. The compressive effect is augmented by joining the two yoke halves by means of not illustrated anchor bolts slipped through bores 42, which extend through the base perpendicularly to the plane of symmetry between the yoke halves. Lengthened when compressed, the round-section cord 41 can escape sideways, that is, in a direction perpendicular to the pin axis. The anchor bolts can be threaded into the other yoke half or can be slipped through both.

Figure 3C:
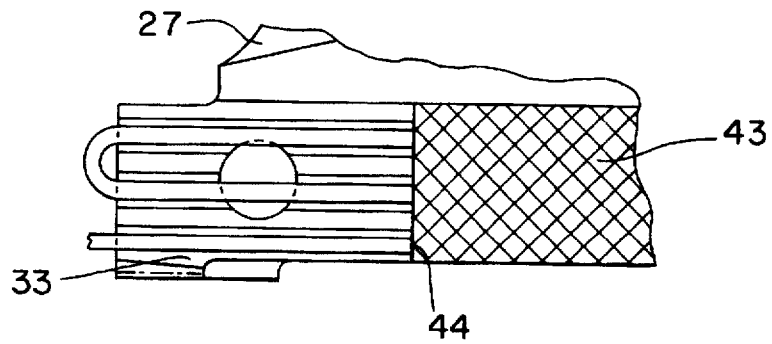

FIG. 3c shows an option for achieving a seal in the center of the interfaces between both yoke halves, in a view of an interface section of a yoke half. The spur toothing on the interfaces being for manufacturing reasons preferably arranged only in the radially outer areas of the interfaces, a filler piece 43, preferably of an elastomer material, is for achievement of a tight contact of both yoke halves provided between the two interfaces in the area not affected by the toothing. The filler piece has preferably a machining allowance of about 1 millimeter in relation to the not illustrated parting line created due to machining the toothing between the two yoke halves, as these are joined. Filler piece 43 is in the assembly of the yoke halves forced on the end faces 44 of the spur toothing 33 and the interfaces of the yoke halves, not illustrated here, in the parting line.

FIGS. 4 illustrate another option for the inventional toothing arrangement in the interface areas of the two yoke halves of a flange driver. Flange driver 45 is comprised of the two yoke halves 47 and 48. Both yoke halves are illustrated here, for clarity of the spur toothing arrangement, in cavalier projection and a state separated from each other. Each yoke half 47, 48 has a base 49, 50 fashioned as a flange and a bearing part 51, 52 forming with the base 49, 50 a structural unit, and a bearing bore 53, 54 each. The flange 49, 50 is of a semicircular design and features on its side 55, 56 away from the bearing part, in the area of its outer circumference 57, 58, a toothing 59, 60 extending across the entire circular arc. The alignment of this toothing to that on the connecting piece to be joined to it, which is not illustrated in detail here, is axial and the toothing flank lines extend relative to the shape of the flange in radial direction. The toothing 59, 60 is fashioned as a spur serration.

The bases 49 and 50 of the two yokes halves are asymmetric relative to each other. The manufacture of the yoke halves takes place separately and in a way such that the yoke half 47 features recesses 62 and 63, while the yoke half 48 possesses overlaps 64 and, not shown completely here, 65. Recess 62 is formed by the partial interfaces 66, 67 and 68, while the recess 63 is defined by the partial interfaces 66, 69 and 70. Overlaps 64 and 65 are formed by the partial interfaces 71, 72 and 73 as well as 71, 74 and, not illustrated here, 75. Owing to the complementary recesses and overlaps, the two yoke halves 47, 48 are moved into a fixedly defined mutual position as they are nested. The partial interfaces 67, 70 feature a spur toothing 76, 77. On the partial interfaces 72, 74, the spur toothings 78, 79 complementary thereto are provided.

Figure 4B:
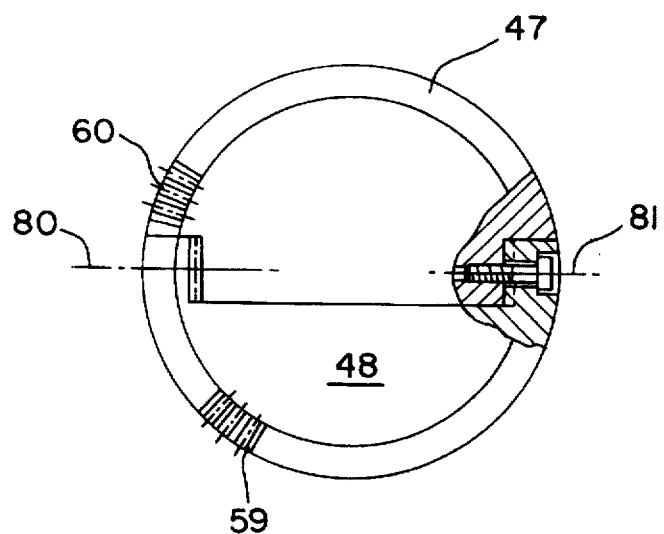
FIGS. 4a and 4b an inventional embodiment of a flange driver with asymmetric bases of the yoke halves in two views.
Figure 4A:
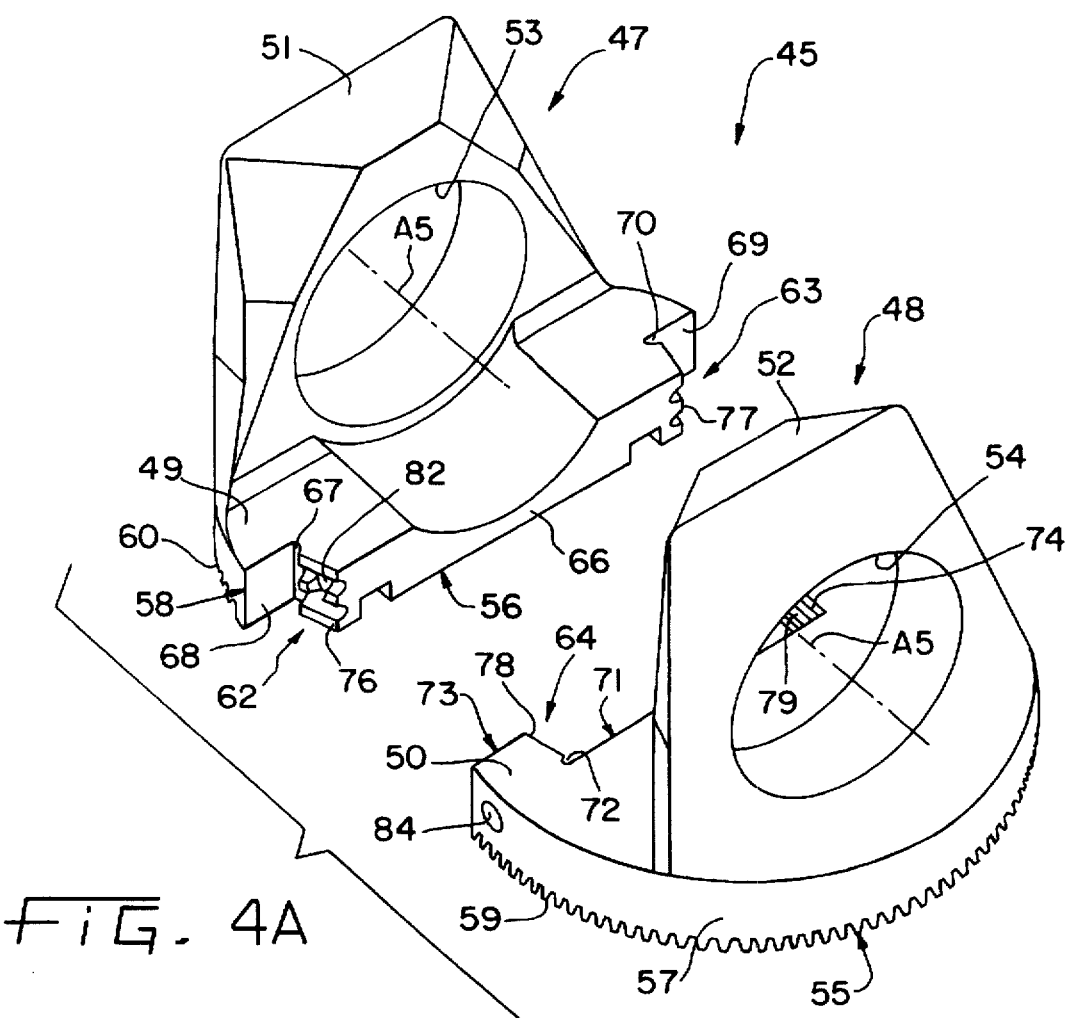

In this FIG. 4a, the two yoke halves 47, 48 are shown separated from each, for reason of clarity. In built-in state, these two yoke halves 47, 48 form a structural unit 45, due to the two positive connections established by the toothings 76, 78 and 77, 79. This structural unit is shown in FIG. 4b in a bottom view of the spur serration 59, 60 of the two yoke halves. Screw joints 80 and 81 are provided for mounting and to facilitate the manufacture and assembly. To obtain said joints, both yoke halves feature bores which may be provided with a threading. In this case, for instance, the partial interfaces 67 and 70 feature bores 82 and—not shown in detail here—80 with internal threading. The bores 84 and—not illustrated here—85 may be fashioned as throughbores or tapped bores as well. Available here as well is the option, not illustrated in detail, of fashioning the bores 82 and 80 as smooth holes, so that only a screw in the form of a tie bolt extends through the flange respectively base of the flange driver.

The flange driver 48 is preferably fashioned of two separately manufactured yoke halves, in such a way that both yoke halves 47, 48 created are by nesting restored to a structural unit, with the one yoke half 47 serving to center the other yoke half 48. Mutually complementary toothings are provided on adjoining interfaces of the two yoke halves, so as to obtain a positive connection. In the embodiment shown in FIG. 4a, these toothings 76, 77, 78 and 79 are fashioned as spur toothings whose flank lines extend essentially parallel to an axis A5 of a pin assembled in the yoke, with the axis A5 and the flank lines projected in a common plane. Projected in their built-in, not illustrated state in a plane with the yoke axis G, the flank lines are directed perpendicularly to the yoke axis. The two yoke halves 47 and 48 are then, with the aid of the positive joint achieved by the toothings, combined to a structural unit 45 and joined to each other by means of screw joints 80 and 81, as illustrated in FIG. 4b. Next, a spur serration composed of individual partial toothings 59 respectively 60 of the individual yoke halves 47 and 48 is machined in the side away from the pin axis, of both bases 49 respectively 50 of the yoke halves 47 and 48. The sealing option described in FIG. 3b is applicable for this case in analogy.

Figure 5:
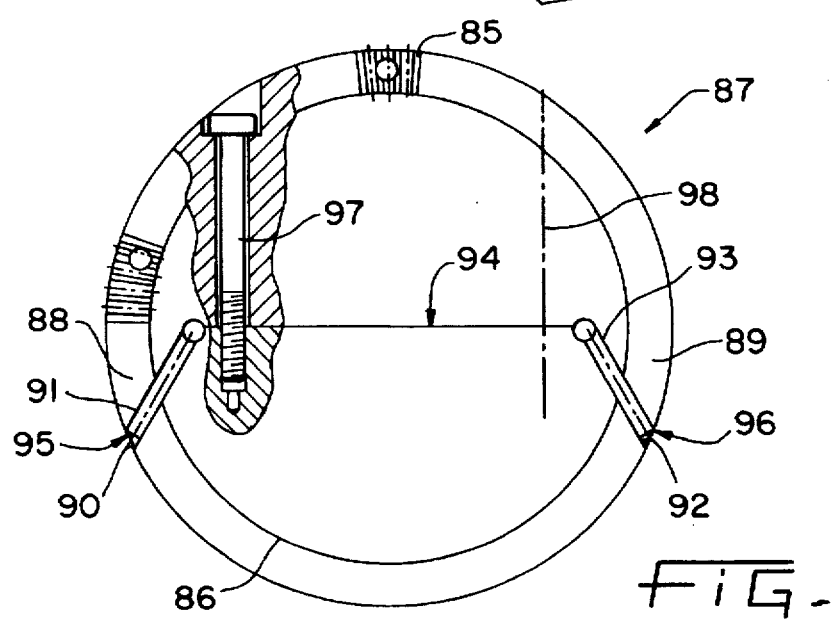
FIG. 5 another option for inventional embodiment of a flange driver.

FIG. 5 illustrates another option of designing a flange driver with two yoke halves—a yoke half 85 and a yoke half 86—and, associated with it, another option for arrangement of mutually complementary toothings serving to establish the positive joining of the two yoke halves to each other, in a view corresponding to the plan view of the flange underside, i.e., of the flange driver side away from the axis of a pin assembled in the yoke. The flange driver 87 is so split in two yoke halves 85 and 86 that the one yoke half 86 performs a centering function for the other yoke half 85. To that end, the yoke half 86 features two recesses which in their dimensions essentially match the overlaps 88 respectively 89 of the yoke half 85. On the facing surfaces 90 and 91 respectively 92 and 93 of the parting line 94 in the area of the overlaps there are mutually complementary toothings provided on the individual yoke halves 85 and 86, which serve to establish the positive connections 95 and 96.

To facilitate the assembly and manufacture, the two yoke halves 85 respectively 86 are joined to each other by means of the two bolts 97, 98. These bolts, here too, serve merely to facilitate the manufacture and assembly; they do not participate in the transmission of force.

Figure 6A:
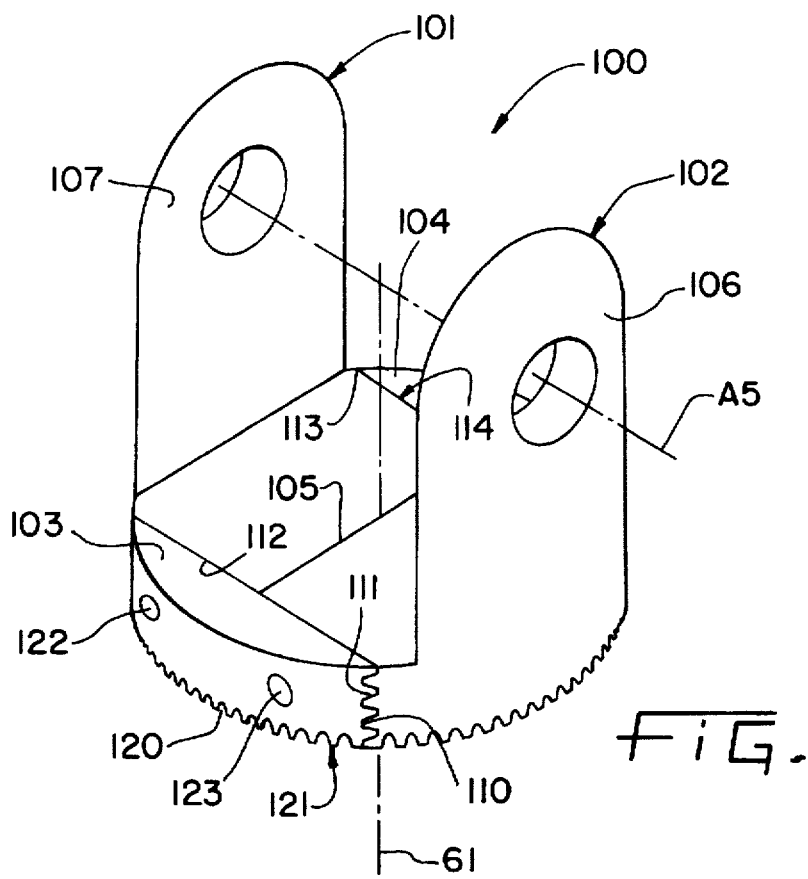
FIGS. 6a and 6b an inventional flange driver with segment parts in two views.
Figure 6B:
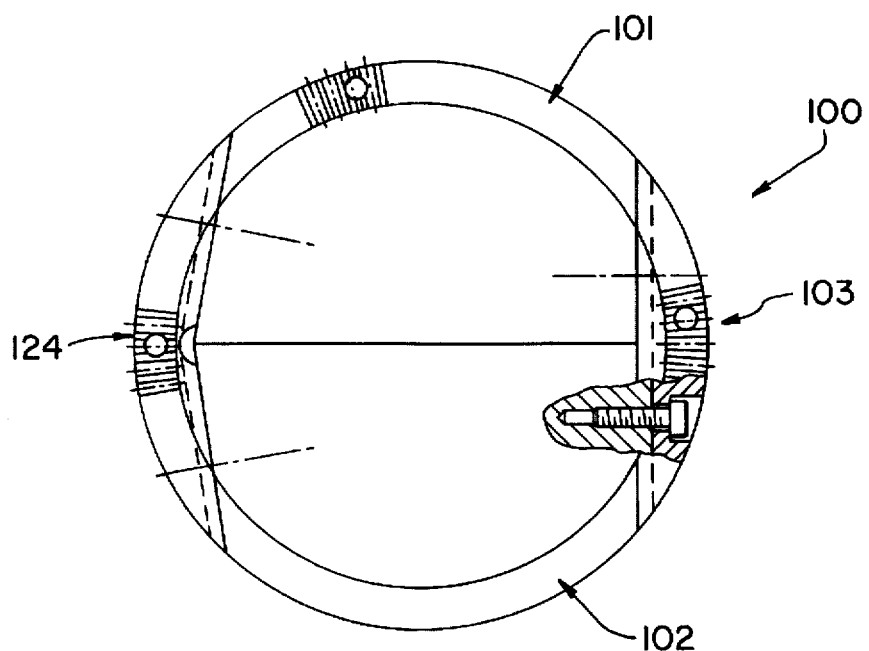

FIGS. 6a and 6b show another option for solving the problem underlying the invention. Here, a flange driver 100 is comprised of the two yoke halves 101 and 102 as well as two segments 103 and 104, which jointly with the two yoke halves form the flange driver 100.

The flange driver 100 may be cast as a single-piece component, the casting contour being adapted here as well to the flange driver contour, especially of the base, Next, s desired later. Next, two segments 103 and 104 are removed from the flange driver, followed by splitting it in two yoke halves 101 and 102 along parting line 105. The segments are removed from the base of the single-piece flange driver. The removal is such that the two bearing parts 106 and 107 remain unaffected. Created along the parting line between individual segments 103, 104 and the two yoke halves 101 and 102 are thus interfaces 110, 111 and 112 respectively 113, 114 and—not shown here—115. Interface 112 is formed by the yoke half 101 while yoke half 111 is formed by yoke (half) 102. Segment 103 forms the interface 110. Mutually complementary toothings contributing to achieving a positive joint between segments 103 respectively 104 and the individual yoke halves 101 respectively 102 are provided on the interfaces. Splitting the flange driver in the two yoke halves 101 and 102 is carried out preferably after machining the toothing in the surface formed by the partial surfaces 111 and 112.

Additionally, the segments 103, 104 are joined to the yoke halves 101, 102 by screw joints. For clarity, merely the arrangement of bores 122 and 123 provided for the screw joint is illustrated here. The screw joints merely serve to facilitate the manufacture of the flange driver, particularly the manufacture of the spur serration 120 on the underside 121 of the flange driver 104. To that end, the two yoke halves 101 and 102 are positively joined to the two segments 103 and 104 by way of the toothing and additionally by means of the screw joints. The spur serration 120 is then machined in this combined flange driver on its underside 121.

FIG. 6b shows a bottom view of the flange driver 100 according to FIG. 6a and, for clarity, in the same figure, another option for designing a segment 124. While segment 103 is removed from the flange driver in such a way that its interface 110 extends perpendicularly to the plane of symmetry of the two yoke halves 101 and 102, segment 124 features a recess which is offset again by an appropriate design of yoke halves 101 and 102. A flange driver is preferably composed of mutually symmetric components, i.e., the two segment parts and yoke halves are interchangeable. Segment 103 of FIG. 6a, e.g., can be used also instead of segment part 104.

The segment parts 103, 124 are joined to the yoke halves 101 and 102 by means of screw joints not shown in detail here.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flange driver for a cardan joint, the cardan joint having a spider including two pins disposed offset by 90° relative to each other, said flange driver adapted to engage a shaft, the shaft defining a yoke axis, said flange driver comprising:

two mutually complementary yoke halves positively connected together, each said yoke half having a base and a bearing part, each said bearing part having a bore therein, said bores defining a pin axis, said pin axis and said yoke axis defining a plane;

each said yoke half base having an end face including a plurality of spurs for engagement with the shaft, said plurality of spurs extending radially from said yoke axis;

each said yoke half having an interface surface disposed substantially perpendicular to the pin axis, said interface surface having teeth disposed thereon extending toward the interface surface of the other yoke half and mating therewith, said teeth having engageable tooth flanks that engage adjacent respective tooth flanks on the other yoke half, said engageable tooth flanks defining at least one tangent line that is non-parallel to said plate, whereby relative movement of said yoke halves along the direction of the yoke axis is prevented.

2. The flange driver of claim 1, wherein each said base has a mutually symmetric design.

3. The flange driver of claim 1, wherein said base of one said yoke half has at least one recess and said base of the other yoke half has at least one mating protrusion, each said recess and said protrusion having an interface surface, said teeth disposed on said interface surface defined by said recess and said protrusion.

4. The flange driver of claim 1, wherein said teeth are disposed at a radially outer area of said interface surface.

5. The flange driver of claim 1, wherein said engaged tooth flanks extend substantially perpendicular to said plane.

6. The flange driver of claim 1, wherein said teeth comprise spur teeth.

7. The flange driver of claim 1, wherein said teeth comprise hypoid teeth.

8. The flange driver of claim 1, further comprising sealing means disposed between said teeth of each said yoke half for sealing therebetween.

9. The flange driver of claim 8, wherein said sealing means comprises an elastomeric round-section cord.

* * * * *

UNITED STATES PATENT AND TRADEMARK OFFICE
CERTIFICATE OF CORRECTION

PATENT NO. : 5,746,659
DATED : May 5, 1998
INVENTOR(S) : Hans Lindenthal

It is certified that error appears in the above-identified patent and that said Letters Patent is hereby corrected as shown below:

Claim 1, Col. 10, Line 42, delete "plate" and insert --plane--.

Signed and Sealed this

Twenty-fifth Day of August, 1998

Attest:

BRUCE LEHMAN

Attesting Officer

Commissioner of Patents and Trademarks